(12) United States Patent
Lim et al.

(10) Patent No.: US 9,190,029 B2
(45) Date of Patent: Nov. 17, 2015

(54) DISPLAY APPARATUS AND METHOD OF CONTROLLING THE SAME

(71) Applicant: SAMSUNG DISPLAY CO., LTD., Yongin-si, Gyeonggi-do (KR)

(72) Inventors: Sang-Hyun Lim, Yongin-si (KR); Sung-Sang Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 307 days.

(21) Appl. No.: 13/665,867

(22) Filed: Oct. 31, 2012

(65) Prior Publication Data

US 2013/0335453 A1 Dec. 19, 2013

(30) Foreign Application Priority Data

Jun. 15, 2012 (KR) .......................... 10-2012-0064591

(51) Int. Cl.
| | |
|---|---|
| *G09G 5/00* | (2006.01) |
| *G09G 5/373* | (2006.01) |
| *G06F 3/03* | (2006.01) |
| *G06F 3/042* | (2006.01) |
| *G06F 3/0488* | (2013.01) |
| *G06F 1/16* | (2006.01) |

(52) U.S. Cl.
CPC .............. *G09G 5/373* (2013.01); *G06F 1/1694* (2013.01); *G06F 3/03* (2013.01); *G06F 3/042* (2013.01); *G06F 3/0488* (2013.01)

(58) Field of Classification Search
CPC .............. G06F 3/04847; G06F 3/0484; G06F 2203/04803; G06F 3/041

USPC ................................................... 345/661, 741
See application file for complete search history.

(56) References Cited

U.S. PATENT DOCUMENTS

| | | | | |
|---|---|---|---|---|
| 2008/0119237 | A1* | 5/2008 | Kim ............................... | 455/566 |
| 2009/0184935 | A1* | 7/2009 | Kim ............................... | 345/173 |
| 2009/0295753 | A1* | 12/2009 | King et al. .................... | 345/174 |
| 2010/0029255 | A1* | 2/2010 | Kim et al. ................... | 455/414.2 |
| 2010/0060475 | A1* | 3/2010 | Choi ............................. | 340/689 |
| 2010/0088061 | A1* | 4/2010 | Horodezky et al. ........... | 702/141 |
| 2011/0316807 | A1 | 12/2011 | Corrion | |
| 2012/0060109 | A1* | 3/2012 | Han et al. ...................... | 715/769 |

FOREIGN PATENT DOCUMENTS

| | | |
|---|---|---|
| KR | 10-2011-0110944 A | 10/2011 |
| KR | 10-2012-0019268 A | 3/2012 |

* cited by examiner

*Primary Examiner* — Mark Zimmerman
*Assistant Examiner* — Sarah Le
(74) *Attorney, Agent, or Firm* — Christie, Parker & Hale, LLP (57) ABSTRACT

A display apparatus including: a display unit for displaying image data in a first display region of the display unit; a motion sensor for sensing a motion of a user; and a display controller for controlling the display unit to divide the first display region into a bezel display region and a second display region according to the motion of the user sensed by the motion sensor, for displaying variable bezel image data in the bezel display region, for scaling the image data so as to correspond to the second display region, and for displaying the scaled image data in the second display region.

17 Claims, 9 Drawing Sheets

DISPLAY APPARATUS AND METHOD OF CONTROLLING THE SAME

CROSS-REFERENCE TO RELATED PATENT APPLICATIONS

This application claims priority to and the benefit of Korean Patent Application No. 10-2012-0064591, filed on Jun. 15, 2012, in the Korean Intellectual Property Office, the disclosure of which is incorporated herein in its entirety by reference.

BACKGROUND

1. Field

One or more embodiments of the present invention relate to a display apparatus and a method of controlling the same.

2. Description of the Related Art

Mobile electronic devices, such as tablet personal computers (PCs), as well as mobile phones, have been widely used. These mobile electronic devices include a display unit that provides visual information, such as an image, to a user, so as to support various functions. The sizes of components for driving the display unit have decreased, the size of the display unit in electronic devices has increased, and a structure that may be adjusted from a flat state to have a suitable angle has been developed.

In addition, according to the above-described trends, some display units have a thin and wide screen. Additionally, the size of a bezel used with the display units may be small. In particular, when the size of the bezel is small, a user's grasp may cover part of the display unit, which may cause an undesired operation to be performed.

SUMMARY

One or more embodiments of the present invention provide for a display apparatus in which a variable bezel is formed so as to increase user convenience and to reduce or minimize a loss of image data, and a method of controlling the display apparatus.

According to an aspect of the present invention, there is provided a display apparatus including: a display unit configured to display image data in a first display region of the display unit; a motion sensor configured to sense a motion of a user; and a display controller configured to control the display unit to divide the first display region into a bezel display region and a second display region according to the motion of the user sensed by the motion sensor, to display variable bezel image data in the bezel display region, to scale the image data configured to be displayed in the first display region so as to correspond to the second display region, and to display the scaled image data in the second display region.

The display apparatus may further include a case at a rim of the display unit, and the motion sensor may include a touch sensor at at least one of the display unit or the case.

The display apparatus may further include a processor that is electrically coupled to the display controller, and is configured to transmit the image data to the display controller, and to control the display apparatus to stop an operation of the touch sensor in the bezel display region of the first display region.

When the user touches the touch sensor for a first time period, the display controller may be configured to control the display unit to form the bezel display region at a portion of the first display region that corresponds to where the user touched the touch sensor.

The display controller may include: a timing controller configured to define the bezel display region in which the variable bezel image data is displayed, according to the motion of the user sensed by the motion sensor; and a scaler configured to receive the image data from an external device and to scale the image data so as to correspond to the first display region or the second display region.

When a signal is generated in at least two or more portions of the touch sensor, the display controller may be configured to control the display unit to display the bezel display region and the second display region.

The motion sensor may include at least one selected from the group consisting of a proximity sensor, a thermal sensor, an infrared ray (IR) sensor, and a photosensor.

When it is determined by the motion sensor that a body part of the user touches the display unit, the display controller may be configured to control the display unit to display the bezel display region and the second display region.

When a signal is generated by the motion sensor for a second time period time, the display controller may be configured to control the display unit to display the bezel display region and the second display region.

The motion sensor may be at a side surface of the display unit.

The motion sensor may include a gyro sensor that senses a plurality of inclinations of the display unit.

The display controller may be configured to control the display unit to display the bezel display region in a portion of the first display region in which an inclination among the inclinations measured by the gyro sensor is a minimum inclination.

When it is determined that the user's motion has stopped, the display controller may be configured to control the display unit to stop displaying the bezel display region.

The display controller may be configured to control the display unit to display an input unit for receiving an input signal from the user in the bezel display region.

According to another aspect of the present invention, there is provided a method of controlling a display apparatus, the method including: sensing a motion of a user; dividing a first display region of a display unit into a bezel display region in which a variable bezel is to be formed and a second display region in which image data is to be displayed according to the sensed motion; scaling the image data so as to correspond to the second display region; displaying the scaled image data in the second display region; and displaying variable bezel data in the bezel display region.

The motion may include at least one of a motion of grasping the display unit, a motion of accessing the display unit, a motion of touching at least two or more portions of the display unit or a case, and a motion of shaking or inclining the display unit.

The method may further include, when the motion has been stopped, stop displaying the variable bezel data and start displaying the image data in the first display region.

The method may further include displaying an input unit for receiving an input signal from the user in the bezel display region.

BRIEF DESCRIPTION OF THE DRAWINGS

The above and other features and aspects of the present invention will become more apparent by describing in detail embodiments thereof with reference to the attached drawings in which.

DETAILED DESCRIPTION

The present invention will be described with reference to certain embodiments that will now be described together with the attached drawings. However, the present invention is not limited to the following embodiments and may be implemented in various forms; the present embodiments are provided to complete the disclosure of the present invention and to inform one of ordinary skill in the art of aspects of the invention. The present invention is defined by the scope of the appended claims and their equivalents. The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including," "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

While such terms as "first," "second," etc. may be used to describe various components, such components should not be limited to the above terms. The above terms are used only to distinguish one component from another.

Figure 1:
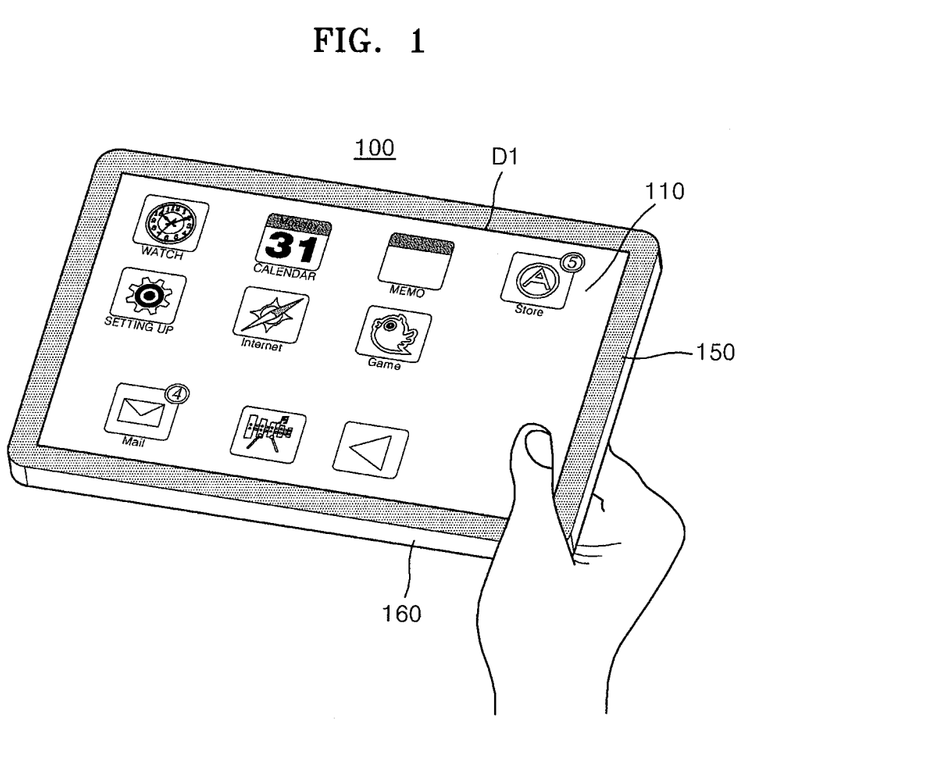
FIG. 1 is a conceptual view of a display apparatus according to an embodiment of the present invention.
Figure 2:
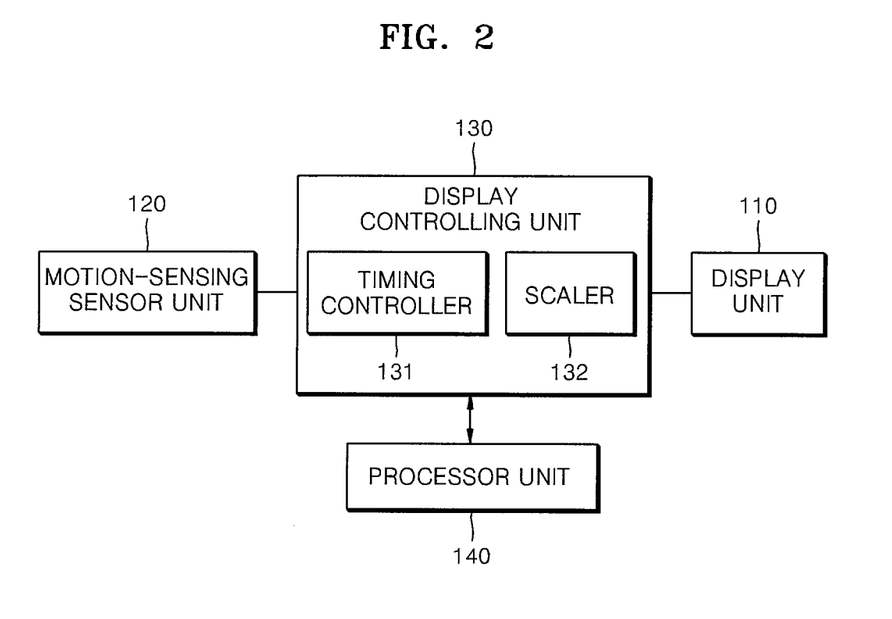
FIG. 2 is a block diagram of a control flow of the display apparatus of FIG. 1.
Figure 3:
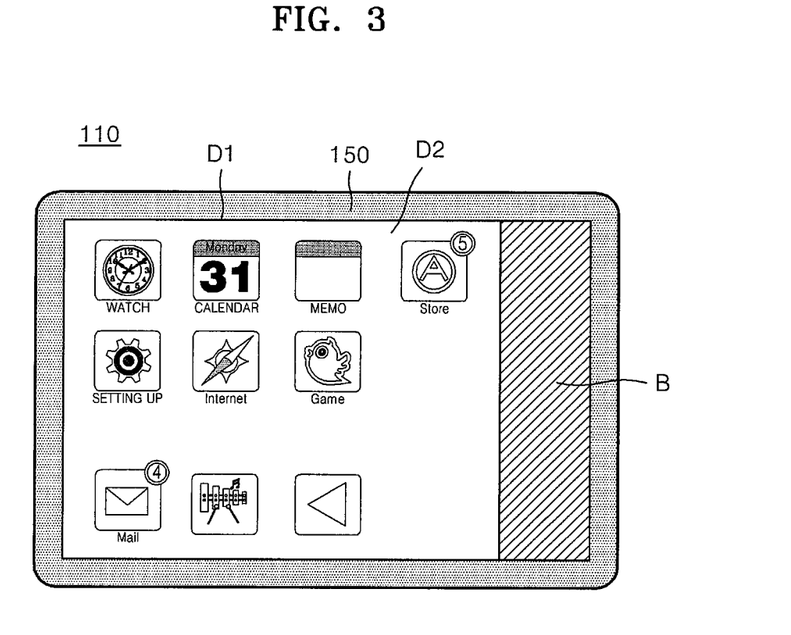
FIG. 3 is a front view of an operating state of a display unit of the display apparatus of FIG. 1.

FIG. 1 is a conceptual view of a display apparatus 100 according to an embodiment of the present invention, FIG. 2 is a block diagram of a control flow of the display apparatus 100 of FIG. 1, and FIG. 3 is a front view of an operating state of a display unit 110 of the display apparatus 100 of FIG. 1.

Referring to FIGS. 1 through 3, the display apparatus 100 includes the display unit 110, which displays image data in a first display region D1 of the display unit 110 (e.g., on a surface of the display unit 110). The display unit 110 may have various forms. For example, the display unit 110 may include any device that displays image data in a region of a surface thereof, for example, a liquid crystal display (LCD) panel, an organic light-emitting display panel, a plasma display panel (PDP), and the like.

A bezel unit 150 of the display unit 110 may be physically formed on the display unit 110 so as to form a rim of the display apparatus 100. The bezel unit 150 may be formed, for example, as an ink, a chassis, or the like.

In addition, the display apparatus 100 may include a case 160 that protects the display unit 110. The case 160 may be at the rim of the display apparatus 100 (e.g., installed around the edge of the display apparatus 110), and may cover the sides and rear of the display apparatus 100. The case 160 may be formed of various materials. For example, the case 160 may be formed of synthetic resin, metal resin, and the like.

The display apparatus 100 may include a motion-sensing sensor unit 120 (e.g., a motion sensor) that senses a motion of a user. The motion-sensing sensor unit 120 may include a touch sensor unit (not shown) that is installed at the display unit 110. As an example, the touch sensor unit may be installed on a surface (e.g., one side) of the display unit 110 and may recognize a touch of the user.

The touch sensor unit may include a touch sensor (not shown), or a plurality of touch sensors may be installed. For example, the plurality of touch sensors may be at the display unit 110 or at a side surface or rear surface of the display apparatus 100.

The display apparatus 100 may include a display controlling unit 130 (e.g., a display controller) that controls the display unit 110 to display image data on the display unit 110. The display controlling unit 130 may control the display unit 110 to display the image data in various shapes. In detail, the display controlling unit 130 may control the display unit 110 to display the image data in the shape of an icon, a button, a screen having a suitable (or predetermined) size, or the like.

The display controlling unit 130 may control the display unit 110 in various ways. For example, the display controlling unit 130 may control the display unit 110 to display the first display region D1 by dividing the first display region D1 into a bezel display region B and a second display region D2 according to the motion of the user sensed by the motion-sensing sensor unit 120. In one embodiment, the bezel display region B corresponds to a part of the first display region D1 where bezel data is displayed. Bezel data may include image data for displaying a virtual bezel, for example, a black image. Additionally, the bezel may be a variable bezel, that is, the portion and sub-region of the first display region D1 which is assigned to the bezel display region B may vary according to the motion of the user.

In addition, the display controlling unit 130 may control the display unit 110 to scale the image data displayed (e.g., presently displayed or intended to be displayed) in the first display region D1 so as to correspond to (e.g., to fit inside of) the second display region D2 and to display the scaled image data in the second display region D2. For example, in an embodiment according to the present invention, the display controlling unit 130 may control the display unit 110 to display the image data in the display region D2 and the bezel data in the display region B.

The display controlling unit 130 may include a timing controller 131 that determines the bezel display region B in which the variable bezel is displayed according to the motion of the user sensed by the motion-sensing sensor unit 120 and/or a time (e.g., a set time or a user configured time). In addition, the display unit 110 may further include a scaler 132 that receives image data from an external device and scales the image data so as to correspond to the first display region D1 or the second display region D2.

The display apparatus 100 may further include a processor unit 140 (e.g., a processor) that is electrically coupled (e.g., electrically connected) to the display controlling unit 130 and transmits the image data to the display controlling unit 130. The processor unit 140 may also be electrically coupled to the scaler 132. In addition, the processor unit 140 may control the display apparatus 100 to stop operations of the touch sensors in the bezel display region B of the display unit 110.

Hereinafter, a method of controlling the display apparatus 100 according to an embodiment of the present invention will be described in detail.

When the display apparatus 100 operates, image data may be displayed in the first display region D1 of the display unit 110. In this case, the first display region D1 may be defined by the bezel unit 150, and the size of the first display region D1 may be determined when the display apparatus 100 is manufactured.

When the image data is displayed in the first display region D1, as described above, the processor unit 140 may transmit the image data corresponding to the first display region D1 to the scaler 132.

In this case, the scaler 132 may scale the image data to display an image that corresponds to the first display region D1 on the surface of the display unit 110. For example, in an embodiment of the present invention, the scaler 132 may calculate the size of the first display region D1, and define resolution and the size of an image that is suitable for the size of the first display region D1. In this case, the display unit 110 is driven according to the defined resolution and size. Also, the scaler 132 may control the display unit 110 to display the image data in a region of the display unit 110 by using the image configured (or optimized) for the first display region D1.

While the display apparatus 100 operates, as described above, the user may grasp the display unit 110 (e.g., touch one surface of the display unit 110). In this case, the touch sensor unit may sense that the user is grasping the display unit 110. That is, the touch sensor unit may sense a motion of grasping the display unit 110 among the user's motions.

As described above, a signal corresponding to a motion (e.g., a touch) sensed by the touch sensor unit may be transmitted to the display controlling unit 130. For example, the signal corresponding to the motion sensed by the touch sensor unit may be transmitted to the timing controller 131, and the timing controller 131 may define a range (e.g., a part or portion) of the first display region D1 in which the variable bezel is to be formed (or displayed), according to the signal transmitted by the touch sensor unit.

In an embodiment of the present invention, when the touch sensed by the touch sensor unit is maintained for a suitable time period (e.g., predetermined or configured time period), for example, thirty seconds, five minutes, one or more hours, etc., the timing controller 131 may determine that the user is grasping the display unit 110 and may define the bezel display region B in which the variable bezel is to be displayed.

In addition, the timing controller 131 may define a region of the first display region D1 (other than a portion where the bezel display region B is displayed), as the second display region D2. In this case, the second display region D2 may be formed (or displayed) differently from the first display region D1. For example, the second display region D2 may be formed to be smaller than the first display region D1.

When the bezel display region B in which the variable bezel is to be formed, is defined (as described above) the timing controller 131 may transmit information regarding the bezel display region B to the processor unit 140. For example, the timing controller 131 may transmit information indicating that the bezel display region B is activated (e.g. the bezel image data is displayed), to the processor unit 140.

The processor unit 140 may receive the information, may generate image data to be displayed on the display unit 110, and may transmit the image data to the display controlling unit 130. In an embodiment, the image data may also be transmitted to the scaler 132.

When the image data is transmitted by the processor unit 140 to the scaler 132, as described above, the scaler 132 may scale the image data so as to correspond to the second display region D2. For example, the scaler 132 may scale the image data based on the size of the second display region D2.

As an example, when the size of the second display region D2 is 3 inches, the scaler 132 may scale the image data so as to generate image data that is suitable for the 3-inch second display region D2. In this case, the scaler 132 may scale all of the image data so as to be displayed in the second display region D2. As another example, when the size of the second display region D2 is 5 inches, the scaler 132 may scale the image data so as to generate image data that is suitable for the 5-inch second display region D2.

That is, according to embodiments of the present invention, since the sizes of the second display region D2 and the first display region D1 may be different from each other, the scaler 132 may scale the image data displayed in the first display region D1 to be suitable for the second display region D2.

For example, the scaler 132 may scale the image data transmitted by the processor unit 140 to be suitable for the first display region D1 or the 3-inch second display region D2.

Thus, the scaler 132 may display all of the image data in the second display region D2 without any substantial loss of the image data displayed (e.g., intended to be or that could have been displayed) in the first display region D1.

While the user grasps the display unit 110, as described above, the first display unit D1 may be divided into the bezel display region B and the second display region D2. However, when the user stops grasping the display unit 110, the first display region D1 may no longer be divided into the bezel display region B and the second display region D2.

In an embodiment, the touch sensor unit may sense whether or not the user stops grasping the display unit 110. For example, when the user takes his/her body part, such as a finger, away from the display unit 110, the touch sensor unit may not sense the touch or the grasping anymore.

The timing controller 131 may determine that the touch or the grasping has not been sensed and may determine whether or not to remove (e.g., stop displaying) the variable bezel. For example, if it is determined that the touch or the grasping has not been sensed by the touch sensor unit a suitable time period (e.g., a predetermined time period), for example, thirty seconds, five minutes, three or more hours, etc., the timing controller 131 may determine that the user's motion of grasping the display unit 110 has been stopped.

If it is determined that the user's motion of grasping the display unit 110 has been stopped, the timing controller 131 may remove (e.g., stop displaying) the bezel in the bezel display region B displayed in the display unit 110 and may display the image data in the first display region D1.

In an embodiment, the timing controller 131 may transmit information indicating that the user's motion of grasping the display unit 110 has been stopped. In this case, the processor unit 140 may determine that the bezel display region B has been removed and may transmit the image data to the scaler 132.

The scaler 132 may receive the image data and may scale the image data so as to be suitable for the first display region D1. In this case, the scaling method is similar to the above description, and thus, detailed descriptions thereof will be given by way of reference to the above description.

The scaler 132 may transmit the scaled image data described above to the display unit 110. In this case, the display unit 110 may display the image data in the first display region D1.

Thus, according to an embodiment of the present invention, when the user grasps one surface of the display unit 110, the display apparatus 100 forms the bezel display region B in a portion that is grasped, thereby preventing malfunction caused by the user's grasp (e.g., obscuring a portion of an image or inadvertent input by the user).

In addition, the display apparatus 100 may display all of the image data in the second display region D2 after forming the variable bezel, thereby transmitting the image data to the user without any substantial loss of the image data.

Figure 4:
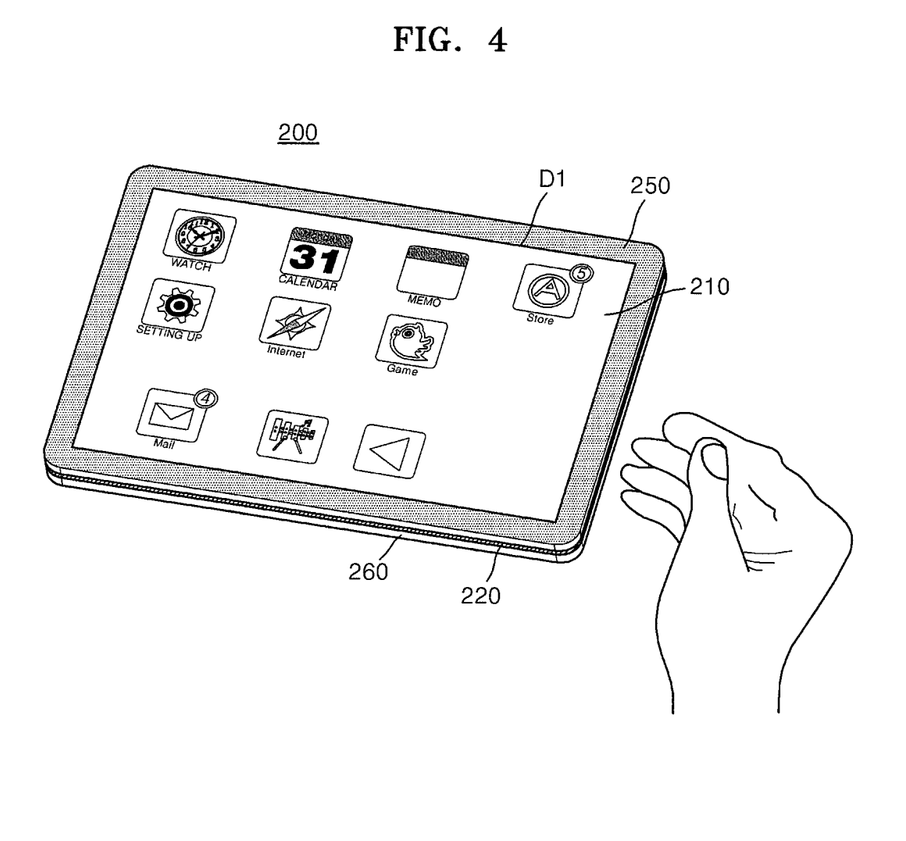
FIG. 4 is a conceptual view of a display apparatus according to another embodiment of the present invention.
Figure 5:
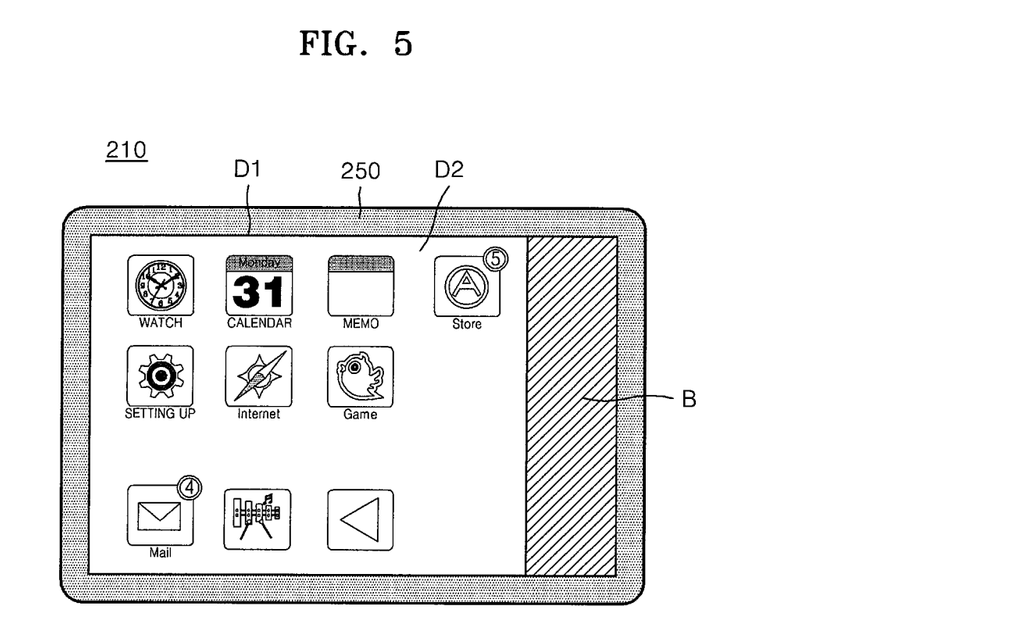
FIG. 5 is a front view of an operating state of a display unit of the display apparatus of FIG. 4.

FIG. 4 is a conceptual view of a display apparatus 200 according to another embodiment of the present invention, and FIG. 5 is a front view of an operating state of a display unit 210 of the display apparatus 200 of FIG. 4.

Referring to FIGS. 4 and 5, the display apparatus 200 may include the display unit 210, a motion-sensing sensor unit 220, a display controlling unit (not shown), a processor unit (not shown), a bezel unit 250, and a case 260. The display unit 210, the processor unit, the bezel unit 250, and the case 260 are the same as (or substantially similar to) those of FIGS. 1 through 3 described above, and thus detailed descriptions thereof will be given by way of reference to the above descriptions.

The display controlling unit may include a timing controller (not shown) and a scaler (not shown). The display controlling unit, the timing controller, the scaler, and the processor unit are the same as (or substantially similar to) those of FIGS. 1 through 3 described above, and thus, detailed descriptions thereof will be given by way of reference to the above descriptions.

The motion-sensing sensor unit 220 may have various shapes in which a user access (e.g., input, motion, touch, etc.) is sensed. For example, the motion-sensing sensor unit 220 may include at least one of a proximity sensor, a thermal sensor, an infrared ray (IR) sensor, a photosensor, or the like. However, for convenience of explanation, an embodiment in which the motion-sensing sensor unit 220 includes the thermal sensor (not shown) will now be described in detail.

The motion-sensing sensor unit 220 may be at a side surface of the display unit 210. In an embodiment, the motion-sensing sensor unit 220 may be disposed outside the case 260. For example, the motion-sensing sensor unit 220 may be installed to encompass a contour of the case 260.

An operation of the display apparatus 200 having the above structure will now be described below.

The display apparatus 200 may sense the user's motion similarly to the above description. In this case, the user's motion may be an access motion (e.g., touch, grasp, shake, tilt, etc.) by which the user accesses the display unit 210.

In an embodiment, when the display apparatus 200 operates, the motion-sensing sensor unit 220 may sense the access motion. For example, when the user accesses the display unit 210 using his/her body part, such as a hand, the motion-sensing sensor unit 220 may sense the user access.

The motion-sensing sensor unit 220 may transmit a signal to the timing controller. The timing controller may define the bezel display region B and the second display region D2 by using the above-described method.

For example, when a touch sensed by a touch sensor unit is maintained for a suitable time period (e.g., a predetermined time period), for example, thirty seconds, five minutes, one or more hours, etc., the timing controller may determine that the user is grasping the display unit 210 and may define the bezel display region B in which a variable bezel is to be formed. In addition, the timing controller may define a region of the first display region D1 (other than the bezel display region B) as the second display region D2.

Information regarding the bezel display region B and the second display region D2 (defined as above) may be transmitted to the processor unit. In this case, the processor unit may generate image data, and may transmit the generated image data to the display controlling unit, as described above. For example, the image data may be transmitted to the scaler.

When the image data is transmitted to the scaler, the scaler may scale the image data so as to correspond to the second display region D2, as described above. The scaling method is the same as (or substantially similar to) that of FIGS. 1 through 3, and thus, detailed descriptions thereof will be given by way of reference the above descriptions.

As described above, when the bezel display region B and the second display region D2 are displayed in the display unit 210, the access motion may be stopped.

When the user takes his/her body part away from the display unit 210, the motion-sensing sensor unit 220 may sense that the user's body part has been taken away from the display unit 210. Here, the motion-sensing sensor unit 220 may not generate a signal anymore when the user's body part has been taken away from the display unit 210.

As described above, if no signal is generated, the timing controller may determine whether or not to remove the variable bezel. In this case, if it is determined by the motion-sensing sensor unit 220 that no signal has been generated for a suitable time period (e.g., a predetermined time period), for example, thirty seconds, five minutes, three or more hours, etc., the timing controller may determine that the user's body part has been taken away from the display unit 210.

As described above, if it is determined that the access motion has been stopped, the display controlling unit and the processor unit may be controlled in a manner the same as (or substantially similar to) that of FIGS. 1 through 3. In particular, the bezel display region B and the second display region D2 may be removed from the display unit 210, and the first display region D1 may be displayed by the display unit 210.

Thus, according to an embodiment of the present invention, when the user grasps one surface of the display unit 210, the display apparatus 200 forms the bezel display region B in a portion that is grasped, thereby preventing malfunction caused by the user's grasp.

In addition, the display apparatus 200 may form the variable bezel and may display all of the image data in the second display region D2, thereby transmitting the image data to the user without any substantial loss of the image data.

Figure 6:
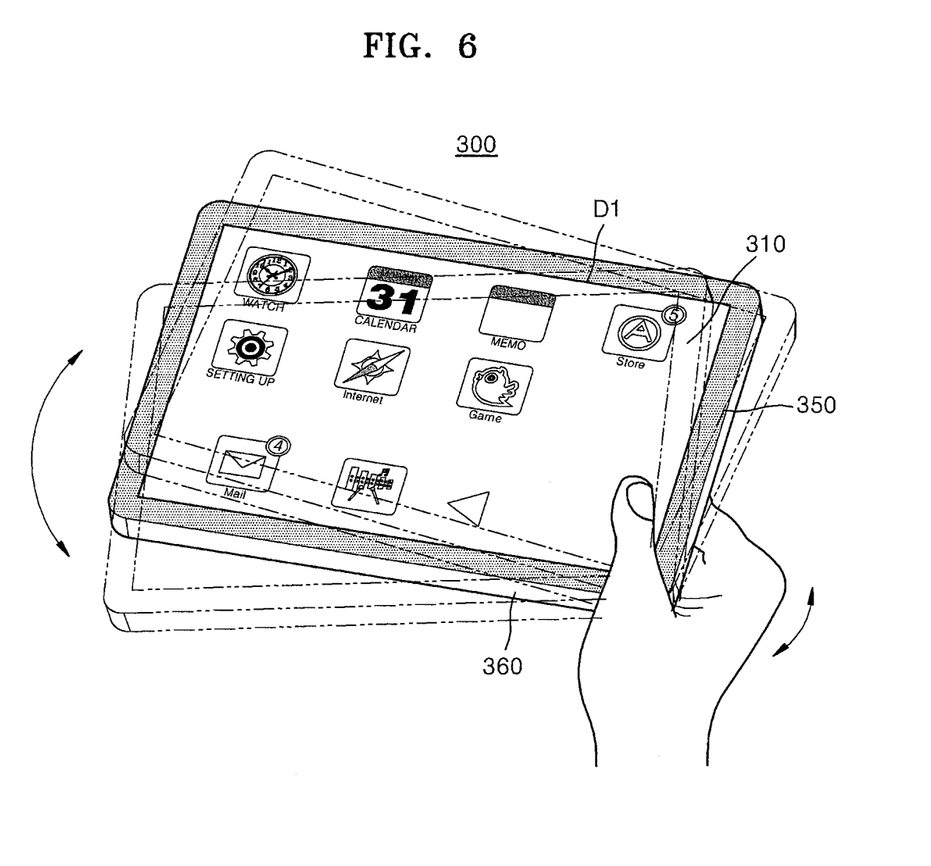
FIG. 6 is a conceptual view of a display apparatus according to another embodiment of the present invention.
Figure 7:
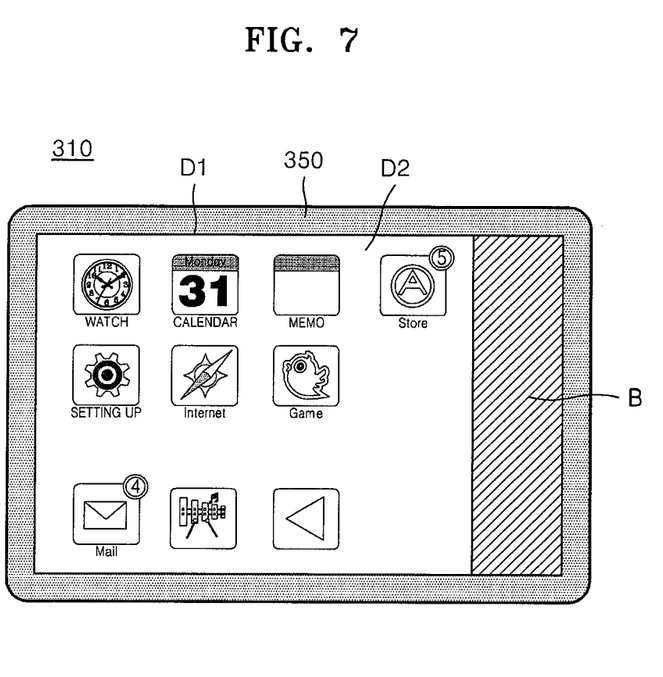
FIG. 7 is a front view of an operating state of a display unit of the display apparatus of FIG. 6.

FIG. 6 is a conceptual view of a display apparatus 300 according to another embodiment of the present invention, and FIG. 7 is a front view of a display unit 310 of the display apparatus 300 illustrated in FIG. 6.

Referring to FIGS. 6 and 7, the display apparatus 300 may include the display unit 310, a motion-sensing sensor unit (not shown), a display controlling unit (not shown), a processor unit (not shown), a bezel unit 350, and a case 360. The display unit 310, the processor unit, the bezel unit 350, and the case 360 are the same as (or substantially similar to) those of FIGS. 1 through 3 and FIGS. 4 and 5, and thus, detailed descriptions thereof will be given by way of reference to the above descriptions.

In an embodiment, the display controlling unit may include a timing controller (not shown) and a scaler (not shown). The display controlling unit, the timing controller, the scaler, and the processor unit are the same as (or substantially similar to) those of FIGS. 1 through 3 and FIGS. 4 and 5 described above, and thus, detailed descriptions thereof will be given by way of reference to the above descriptions.

The motion-sensing sensor unit may include a gyro sensor (not shown) as well as a touch sensor unit, a proximity sensor, a thermal sensor, an infrared ray (IR) sensor, or a photosensor, as described above. In this case, the motion-sensing sensor unit may sense a shake motion that occurs when the display unit 310 is shaken or inclined.

In detail, when the user grasps the display apparatus 300, shaking may occur along one or more axes of the motion-sensing sensor unit. According to an embodiment of the present invention, since the motion-sensing sensor unit is shaken in a direction perpendicular to the display unit 310, the motion-sensing sensor unit senses shaking of vertical components of the image data so that precision of the display apparatus 300 may be improved.

In addition, when the user grasps the display apparatus 300 with one hand, as described above, a portion where a variable bezel is to be formed, may be selected as a portion where less shaking occurs. For example, when the user grasps the display apparatus 300 so as to shake or incline the display apparatus 300, a portion that is grasped is a central axis of rotation of the motion-sensing sensor unit and thus less shaking may occur.

When the user grasps the display apparatus 300 with two hands, all axes of the motion-sensing sensor unit are shaken. Thus, in this case, the motion-sensing sensor unit may sense the shake, may generate a signal, and may transmit the signal to the timing controller.

The motion-sensing sensor unit may transmit the signal to the timing controller. In this case, the timing controller may define the bezel display region B and the second display region D2 by using the above-described method.

For example, when the signal transmitted by the touch sensor unit is maintained for a suitable time period (e.g., a predetermined time period), for example, thirty seconds, five minutes, one or more hours, etc., the timing controller may determine that the user is grasping the display unit 310 and may define the bezel display region B in which the variable bezel is to be formed. In addition, the timing controller may define a region of the first display region D1 (other than the bezel display region B) as the second display region D2.

Information regarding the bezel display region B and the second display region D2 defined as described above, may be transmitted to the processor unit. The processor unit may generate image data and may transmit the generated image data to the display controlling unit, as described above. For example, the image data may be transmitted to the scaler.

When the image data is transmitted to the scaler, the scaler may scale the image data so as to correspond to the second display region D2, as described above. A detailed scaling method is similar to those of FIGS. 1 through 3 and FIGS. 4 and 5, and thus, detailed descriptions thereof will be given by way of reference to the above descriptions.

As described above, when the bezel display region B and the second display region D2 are displayed in the display unit 310, the access motion may be stopped.

For example, when the user takes his/her body part away from the display unit 310, the motion-sensing sensor unit may sense that the user's body part has been taken away from the display unit 310. When the user's body part has been taken away from the display unit 310, the motion-sensing sensor unit may not generate a signal anymore. That is, axes of the motion-sensing sensor unit may not be shaking.

If no access motion is sensed, as described above, the timing controller may determine whether or not to remove the variable bezel. In an embodiment, if it is determined by the motion-sensing sensor unit that no motion has been generated for a suitable time period (e.g., a predetermined time period), for example, thirty seconds, five minutes, three or more hours, etc., the timing controller may determine that the user's body part has been taken away from the display unit 310.

As described above, if it is determined that the access motion has been stopped, the display controlling unit and the processor unit may be controlled in a manner the same as (or substantially similar to) those of FIGS. 1 through 3 and FIGS. 4 and 5. For example, the first display region D1 may not longer be divided into the bezel display region B and the second display region D2.

Thus, according to an embodiment of the present invention, when the user grasps one surface of the display unit 310, the display apparatus 300 forms the bezel display region B in a portion that is grasped, thereby preventing malfunction caused by the user's grasp.

In addition, the display apparatus 300 may form the variable bezel and may display all of the image data in the second display region D2, thereby transmitting the image data to the user without any substantial loss of the image data.

Figure 8:
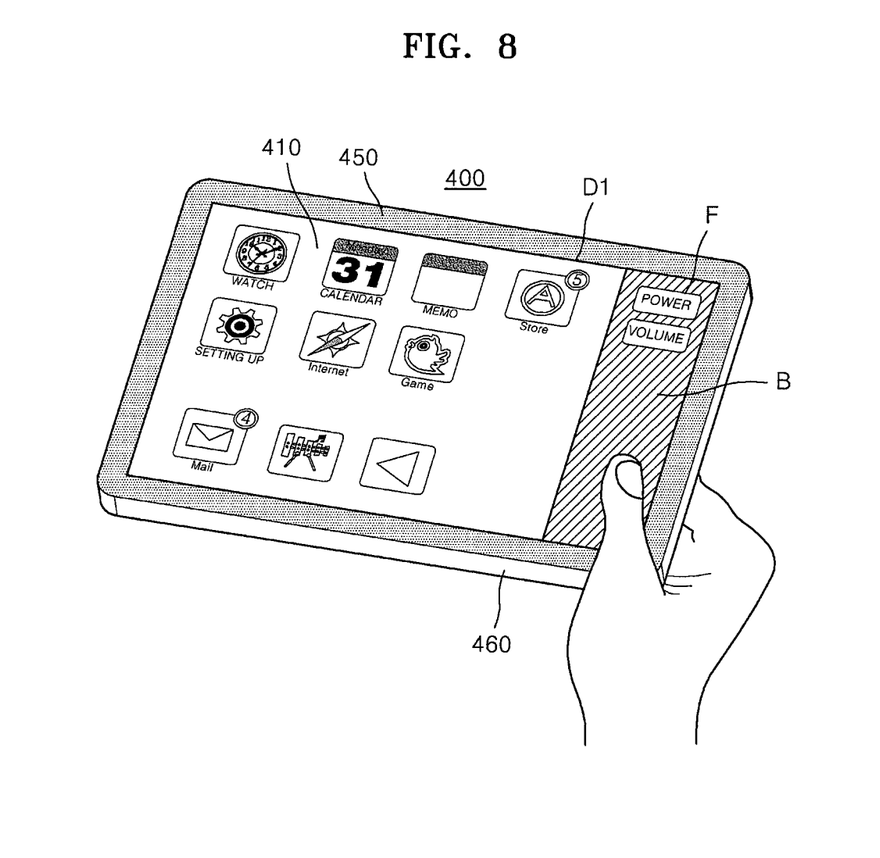
FIG. 8 is a conceptual view of a display apparatus according to another embodiment of the present invention.
Figure 9:
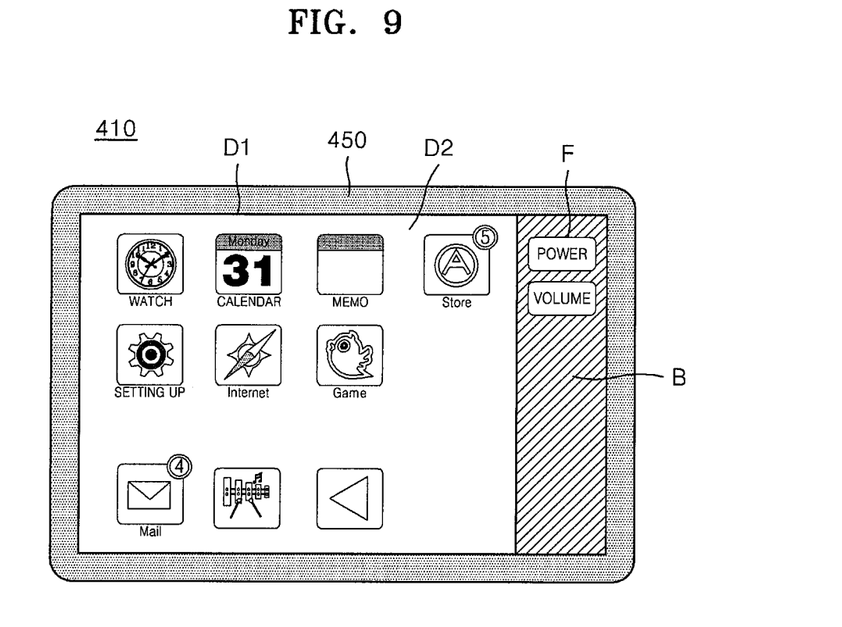
FIG. 9 is a front view of an operating state of a display unit of the display apparatus of FIG. 8.

FIG. 8 is a conceptual view of a display apparatus 400 according to another embodiment of the present invention, and FIG. 9 is a front view of a display unit 410 of the display apparatus 400 illustrated in FIG. 8.

Referring to FIGS. 8 and 9, the display apparatus 400 may include the display unit 410, a motion-sensing sensor unit (not shown), a display controlling unit (not shown), a processor unit (not shown), a bezel unit 450, and a case 460. The display unit 410, the processor unit, the bezel unit 450, and the case 460 are the same as (or substantially similar to) those of FIGS. 1 through 3, FIGS. 4 and 5, and FIGS. 6 and 7, and thus, detailed descriptions thereof will be given by way of reference to the above descriptions.

In addition, the display controlling unit may include a timing controller (not shown) and a scaler (not shown). The display controlling unit, the timing controller, the scaler, and the processor unit are the same as (or substantially similar to) those of FIGS. 1 through 3, FIGS. 4 and 5, and FIGS. 6 and 7 and thus detailed descriptions thereof will be given by way of reference to the above descriptions.

The motion-sensing sensor unit may include a touch sensor unit (not shown), for example, as illustrated in FIGS. 1 through 4. The touch sensor unit may include a plurality of touch sensors. In an embodiment, the plurality of touch sensors may be installed at the display unit 410 or at a side surface or rear surface of the display apparatus 400. For example, the plurality of touch sensors may be installed at the display unit 410 or the case 460.

An operation of the display apparatus 400 having the above structure will now be described below.

The motion-sensing sensor unit may sense the user's motion by using a method similar to those of FIGS. 1 through 7. According to an embodiment of the present invention, the user's motion may be a touch motion in which the user touches two or more portions of the display apparatus 400.

When the display apparatus 400 operates, the motion-sensing sensor unit 420 may sense the touch motion. For example, when two or more portions of the user's body part, such as fingers, touch the display apparatus 400 (e.g., to grasp the display apparatus 400), the motion-sensing sensor unit may sense the user's touch.

The motion-sensing sensor unit may transmit a signal corresponding to the sensed touch to the timing controller. For example, when the user's body part touches two or more portions of the display apparatus 400, the motion-sensing sensor unit may generate the signal. The timing controller may then define the bezel display region B and the second display region D2 by using the above-described method.

In an embodiment, when the touch sensed by the touch sensor unit is maintained for a suitable time period (e.g., a predetermined time period), for example, thirty seconds, five minutes, one or more hours, etc., the timing controller may determine that the user is grasping the display apparatus 400 and may define the bezel display region B in which a variable bezel is to be formed. In addition, the timing controller may define a region of the first display region D1 (other than the bezel display region B) as the second display region D2.

Information regarding the bezel display region B and the second display region D2 defined as described above, may be transmitted to the processor unit. The processor unit may generate image data and may transmit the generated image data to the display controlling unit, as described above. For example, the image data may be transmitted to the scaler.

When the image data is transmitted to the scaler, the scaler may scale the image data so as to correspond to the second display region D2, as described above. A scaling method is to the same as (or substantially similar to) those of FIGS. 1 through 7 and thus detailed descriptions thereof will be given by way of reference to the above descriptions.

According to an embodiment of the present invention, when the bezel display region B and the second display region D2 are displayed, the input unit F may be displayed in the bezel display region B. For example, the display controlling unit may control the display unit 410 so as to display the input unit F in the bezel display region B.

The input unit F may include various functions. For example, the input unit F may include various buttons, such as, a volume adjusting unit, a home button, a power button, and the like, or may include various icons. However, aspects of the present invention are not limited thereto, and the input unit F may include buttons or icons having various shapes.

As described above, while the bezel display region B and the second display region D2 are displayed in the display unit 410, the access motion may be stopped.

When the user takes his/her body part away from the display unit 410, the motion-sensing sensor unit (not shown) may sense that the user's body part has been taken away from the display unit 410. For example, when the user's body part has been taken away from the display unit 410, the motion-sensing sensor unit may not generate a signal anymore.

As described above, if no signal is generated, the timing controller may determine whether or not to remove the variable bezel. If it is determined by the motion-sensing sensor unit that no signal has been generated for a suitable time period (e.g., a predetermined time period), for example, thirty seconds, five minutes, three or more hours, etc., the timing controller may determine that the user's body part has been taken away from the display unit 410.

If it is determined that the access motion has been stopped, the display controlling unit and the processor unit may be controlled in a manner the same as (or substantially similar to) those of FIGS. 1 through 7. For example, the first display region D1 may no longer be divided into the bezel display region B and the second display region D2.

Thus, according to an embodiment of the present invention, when the user grasps one surface of the display unit 410, the display apparatus 400 may form the bezel display region B in a portion that is grasped, thereby preventing malfunction caused by the user's grasp.

In addition, the display apparatus 400 may form the variable bezel and may display all of the image data in the second display region D2, thereby transmitting the image data to the user without any substantial loss of the image data.

As described above, in the one or more embodiments of the present invention, a bezel display region is formed on one surface of a display unit according to a user's motion so that malfunction of a display unit caused by the user's motion may be prevented.

In addition, in the one or more embodiments of the present invention, after a variable bezel is formed, all of image data is displayed in a second display region so that the image data may be transmitted to the user without any substantial loss of the image data.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A display apparatus comprising:
   a display unit configured to display image data in a first display region of the display unit;
   a motion sensor configured to sense a shake motion of the display unit; and
   a display controller configured to identify, as a portion grasped by a user, a portion of the display apparatus at which less shaking occurs, to control the display unit to divide the first display region into a bezel display region at the portion grasped by the user and a second display region according to the shake motion of the display unit sensed by the motion sensor, to display variable bezel image data in the bezel display region, to scale the image data configured to be displayed in the first display region so as to correspond to the second display region, and to display the scaled image data in the second display region.

2. The display apparatus of claim 1, further comprising:
   a case at a rim of the display unit; and
   a touch sensor at at least one of the display unit or the case.

3. The display apparatus of claim 2,
   further comprising a processor that is electrically coupled to the display controller, and is configured to transmit the image data to the display controller and to control the display apparatus to stop an operation of the touch sensor in the bezel display region of the first display region.

4. The display apparatus of claim 2,
   wherein, when a user touches the touch sensor for a first time period, the display controller is configured to control the display unit to form the bezel display region at a portion of the first display region that corresponds to where the user touched the touch sensor.

5. The display apparatus of claim 2, wherein the display controller comprises:
   a timing controller configured to define the bezel display region in which the variable bezel image data is displayed according to the shake motion of the display unit sensed by the motion sensor; and
   a scaler configured to receive the image data from an external device, and to scale the image data so as to correspond to the first display region or the second display region.

6. The display apparatus of claim 2,
   wherein, when a signal is generated in at least two or more portions of the touch sensor, the display controller is configured to control the display unit to display the bezel display region and the second display region.

7. The display apparatus of claim 1, further comprising a second sensor selected from the group consisting of a proximity sensor, a thermal sensor, an infrared ray (IR) sensor, and a photosensor.

8. The display apparatus of claim 7,
   wherein, when it is determined by the second sensor that a body part of a user touches the display unit, the display controller is configured to control the display unit to display the bezel display region and the second display region.

9. The display apparatus of claim 8, wherein, when a signal is sensed by the second sensor for a second time period, the display controller is configured to control the display unit to display the bezel display region and the second display region.

10. The display apparatus of claim 7, wherein the second sensor is at a side surface of the display unit.

11. The display apparatus of claim 1, wherein the motion sensor comprises a gyro sensor.

12. The display apparatus of claim 11, wherein the display controller is configured to control the display unit to display the bezel display region when the gyro sensor senses a shake motion of the display unit.

13. The display apparatus of claim 1, wherein, when it is determined that the shake motion has been stopped, the display controller is configured to control the display unit to stop displaying the bezel display region.

14. The display apparatus of claim 1, wherein the display controller is configured to control the display unit to display an input unit for receiving an input signal from a user in the bezel display region.

15. A method of controlling a display apparatus, the method comprising:

sensing a shake motion of the display apparatus;

identifying, as a portion grasped by a user, a portion of the display apparatus at which less shaking occurs, dividing a first display region of a display unit into a bezel display region at the portion grasped by the user, in which a variable bezel is to be formed, and a second display region, in which image data is to be displayed, according to the sensed shake motion;

scaling the image data so as to correspond to the second display region;

displaying the scaled image data in the second display region; and displaying variable bezel data in the bezel display region.

16. The method of claim 15, further comprising, when the shake motion has stopped, stop displaying the variable bezel data and start displaying the image data in the first display region.

17. The method of claim 15, further comprising displaying an input unit for receiving an input signal from a user in the bezel display region.

* * * * *